United States Patent [19]
Karklys

[11] 3,800,313

[45] Mar. 26, 1974

[54] PROGRAMMABLE CONTROL CIRCUIT FOR CASSETTE CHANGER

[75] Inventor: Joseph Karklys, St. Joseph, Mich.

[73] Assignee: Whirlpool Corporation, Benton Harbor, Mich.

[22] Filed: June 11, 1971

[21] Appl. No.: 152,243

[52] U.S. Cl. .......................................... 360/69
[51] Int. Cl. .......................................... G11b 23/12
[58] Field of Search ............... 179/100.2 Z, 100.2 S; 274/41 F; 340/162

[56] References Cited

UNITED STATES PATENTS

| | | | |
|---|---|---|---|
| 3,247,328 | 4/1966 | Mitchell et al. | 274/4 F |
| 3,140,360 | 7/1964 | Whitworth | 179/100.2 Z |
| 3,525,086 | 8/1970 | Lichowsky | 179/100.2 Z |
| 3,599,987 | 8/1971 | Ban | 179/100.2 Z |
| 3,359,007 | 12/1967 | Perreau | 179/100.2 Z |
| 3,556,535 | 1/1971 | Chabot | 179/100.2 Z |

FOREIGN PATENTS OR APPLICATIONS

| | | | |
|---|---|---|---|
| 877,173 | 9/1961 | Great Britain | 179/100.2 Z |

*Primary Examiner*—Bernard Konick
*Assistant Examiner*—Robert S. Tupper
*Attorney, Agent, or Firm*—Hofgren, Wegner, Allen, Stellman & McCord

[57] ABSTRACT

A programming circuit for controlling a cassette positioning mechanism of a cassette magnetic tape player so that preselected ones of a plurality of cassette tape sides are played automatically in sequence. An electronic counter indicates which of the tape sides is being presented at a position to be picked up by providing a count signal on one of a plurality of counter outputs corresponding thereto, and a programming selection switch coupled to each of the counter outputs is provided to select the recordings to be played. When the switch is in the play position, an end-of-tape detector circuit is enabled, and the recording on the tape side being presented is allowed to be played. At the completion of the playing of the tape side, the cassette positioning mechanism is actuated and the counter is advanced by one count in response to an end-of-tape signal from the detector.

11 Claims, 3 Drawing Figures

INVENTOR
JOSEPH KARKLYS
BY Hofgren, Wegner, Allen, Stellman & McCord
ATTORNEYS

PROGRAMMABLE CONTROL CIRCUIT FOR CASSETTE CHANGER

BACKGROUND OF THE INVENTION

1. Field of the Invention

This invention relates to programmable selection mechanisms and, in particular, to a circuit for programming a cassette tape player to sequentially play automatically selected ones of a plurality of cassette tapes.

2. Description of the Prior Art

A recent development in the art of tape handling in magnetic tape playing and recording units has been the introduction of tape cassettes, in which the magnetic tape is oppositely wound about two spools mounted within a plastic case or the like, and tape cartridges, wherein an endless magnetic tape is wound about a single spool mounted within a case. The introduction of such tape cassettes and tape cartridges has stimulated development of various cassette or cartridge changers which automatically introduce a new cassette recording into a tape playing position in which the tape is in operative relationship with a tape head, pinch rollers, brake, tape drive and the like, to be played after the playing of the previous cassette recording has been completed.

Various other mechanisms have been developed which have enabled the user of a cassette tape player to preselect from a plurality of cassette tapes the recordings that he wishes to have played. Such known mechanisms, however, utilize a stepping motor to enable a selection comparison presenting a source of highly objectionable acoustic noise within the product. All such known mechanism are, also, unduly complex and, thus, unreliable and relatively expensive in view of the function they perform.

SUMMARY OF THE INVENTION

The cassette changer control of this invention comprehends a novel and unique means for controlling a cassette changer and tape player to play selected tapes without the use of a stepping motor or like device, effectively avoiding highly objectional acoustic noise. The entire control process necessary to select the proper tapes is done electronically resulting in a substantial decrease in power consumption and increase in control circuit reliability.

In accordance with the present invention, a plurality of program selection switches is provided for selecting which of a corresponding variety of tape recordings is to be played. Each time a tape is introduced into the play position, a counter circuit is advanced to a state corresponding to that tape. The state of the counter circuit, which indicates which recording is being presented, is compared with the state of the selection switch for that recording. If the switch is in a play position, the cassette is maintained at the play position and is played. At the completion of the recording, an end-of-tape condition is detected, the next tape recording of the sequence is presented and the counter circuit is advanced by one count to a new state corresponding to that tape which is then compared with the state of the program selection switch corresponding thereto. If the selection switch for the new tape is also in the play position, the play cycle is repeated. However, if the selection switch is in a skip position, the changer is actuated to present the next tape, and the counter is successively advanced until a counter state is reached corresponding to a recording having its selector switch in the play position.

Further features of the program circuit facilitate operation thereof by the user. More specifically, a circuit is provided to reset the counter to a predetermined count corresponding to the first recording when power is initially applied to the circuit. Indicator lamps are provided to visually indicate the state of the counter and, correspondingly, the recording being presented for playing. The indicator lamps enable the operator to know at a glance which tape is being played and permit changes in the program after it has been initially set.

Thus, an important feature of the invention is the provision of a programming circuit for controlling an automatic cassette changer in accordance with program information supplied by the user so that selected ones of a plurality of recordings are played and others are skipped.

Another feature of this invention is the provision of a programming circuit for controlling the cassette changer in a manner such that the traditionally used stepping motor is eliminated to substantially reduce the operating noise of the controlling circuit.

BRIEF DESCRIPTION OF THE DRAWINGS

Other features and advantages of the invention will be made more apparent in the following detailed description taken in connection with the accompanying drawing, in which.

DESCRIPTION OF THE PREFERRED EMBODIMENT

Figure 1:
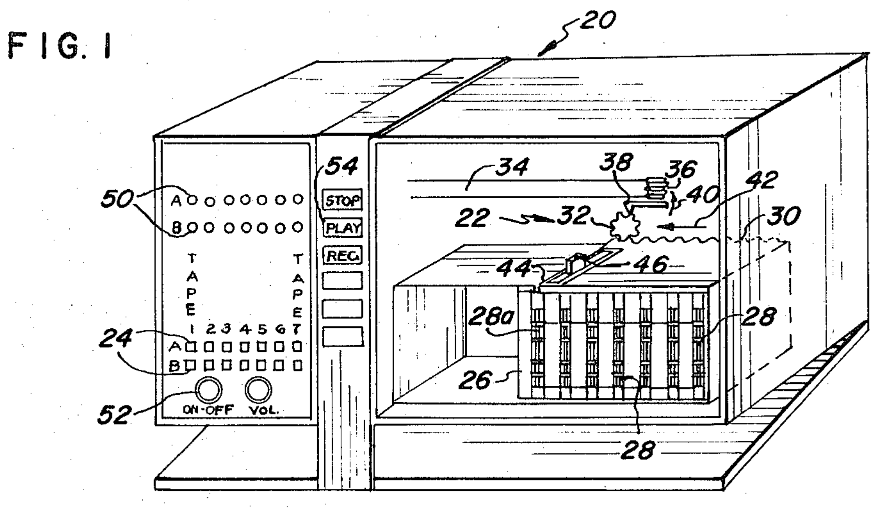
FIG. 1 is a perspective view of a cassette player with an automatic cassette or cartridge changer of the type which may be controlled by the programming circuit.

Referring now to FIG. 1, a cassette player 20 is shown having an automatic cassette changer or cassette presenting mechanism 22 of the type which may be controlled in accordance with information programmed on selection switches 24 of the programming circuit of the present invention. It should be understood that the embodiment of the cassette changer 22 is illustrative only and that any changer which may be actuated in response to current or voltage pulses to successively present cassettes to be played may be controlled by the programming circuit of this invention. Illustratively, the programming circuit may control a cassette changer in which cassettes are presented for playing by moving the tape heads, etc., into operative position with successive cassette tapes rather than moving the tapes into engagement with the tape heads, etc., as is shown. Also, it should be appreciated that although the programming circuit is described in terms of controlling an audio tape player, it may also be used, for example, in conjunction with a video tape player. Further, as will be obvious to those skilled in the art, the programming circuit need not be limited to controlling a changer capable of handling only 14 recordings within seven cassettes, as is shown in the illustrative embodiment.

Cassette changer 22 illustratively may comprise a movably mounted feeder mechanism 26 within which a plurality, such as seven, tape cassettes or cartridges 28 are mounted in a substantially vertical position. The feeder mechanism 26 may include a gear track 30 having gear teeth thereon which may be meshed with gear teeth of wheel 32. Each time an electrical pulse is generated on lead pair 34 by the programming circuit, an electromagnetic coil 36 may be energized to pivot a pawl 38 in a rotary direction indicated by curved arrow 40. Pawl 38, upon being pivoted, may be engaged with one of the teeth of wheel 32 which may be rotated in response thereto to translate gear track 30, feeder mechanism 26 and, thus, cassettes 28, a discrete distance in a direction indicated by arrow 42 toward a play position 44.

Each of the magnetic tapes within cassettes 28 has two sides on which recordings may be made or be played, and each time cassette changer 22 is actuated, a different recording, one on each side, is presented at play position 44 whereat it is in operative engagement with a tape head transducer 46 and other suitable elements for playing the recording (not shown), such as pinch rollers, a capstan, etc., and may be played.

Operator interface with the programming circuit is provided by program selection switches 24 and a corresponding plurality of indicator lamps 50. Two program selection switches 24 are provided for each cassette 28, one switch 24 being provided for side "A" and one switch for side "B" of each of the cassette tape recordings. The pair of switches 24 labelled "TAPE 1" (FIG. 1) corresponds to the furthermost left cassette 28*a*, which is the first cassette to be presented at play position 44. The remaining switches are similarly labelled in the alphanumeric order of which the corresponding tape recordings are presented.

In using cassette player 20 to play a program of recordings, an operator inserts the cassettes 28, which contain the recordings he wishes to be played, into feeder mechanism 26 in the order in which he wants them to be played. As is often the case, an operator may wish to play only one side of the cassette tape or, although he wants either or both sides of the cassette tape to be played in a further program and, thus, inserts it into the feeder mechanism 26, he doesn't want it to be played in the present program. The operator then actuates the selector switches 24 corresponding to the tape sides he does not want to be played into a skip position and those corresponding to the tape sides which he wants to be played into a play position. Visual access to the cassettes 28 mounted within feeder mechanism 26 may be provided so that the operator can read the recording labels which are typically attached to the sides of the cassettes to aid him in setting up the program.

After the appropriate selection switches 24 have been actuated, the program may commence. An on-off switch 52 is provided to apply power to the tape play circuit. Upon actuation of a "play" switch 54, the tape recording or tape side at play position 44 is played or skipped, depending upon the state of the selection switch 24 corresponding to side "A" of the first cassette tape, as previously explained. Of course, in order for that selection switch to actually correspond to side "A" on the first tape, feeder mechanism 26 must be in the position shown in FIG. 1 with the side "A" of "TAPE 1" presented at play position 44. Feeder mechanism 26 may be manually moved by the operator before he starts the program or may be automatically moved to this position by a reset mechanism actuated in response to completion of the last cassette tape of the sequence.

As each cassette tape side is presented at play position 44, a corresponding, properly labelled indicator lamp 50 lights up so that the operator can tell at a glance how far the program has advanced. In he chooses, the operator may then change the state of selection switches 24 to alter the remainder of the program.

Figure 2:
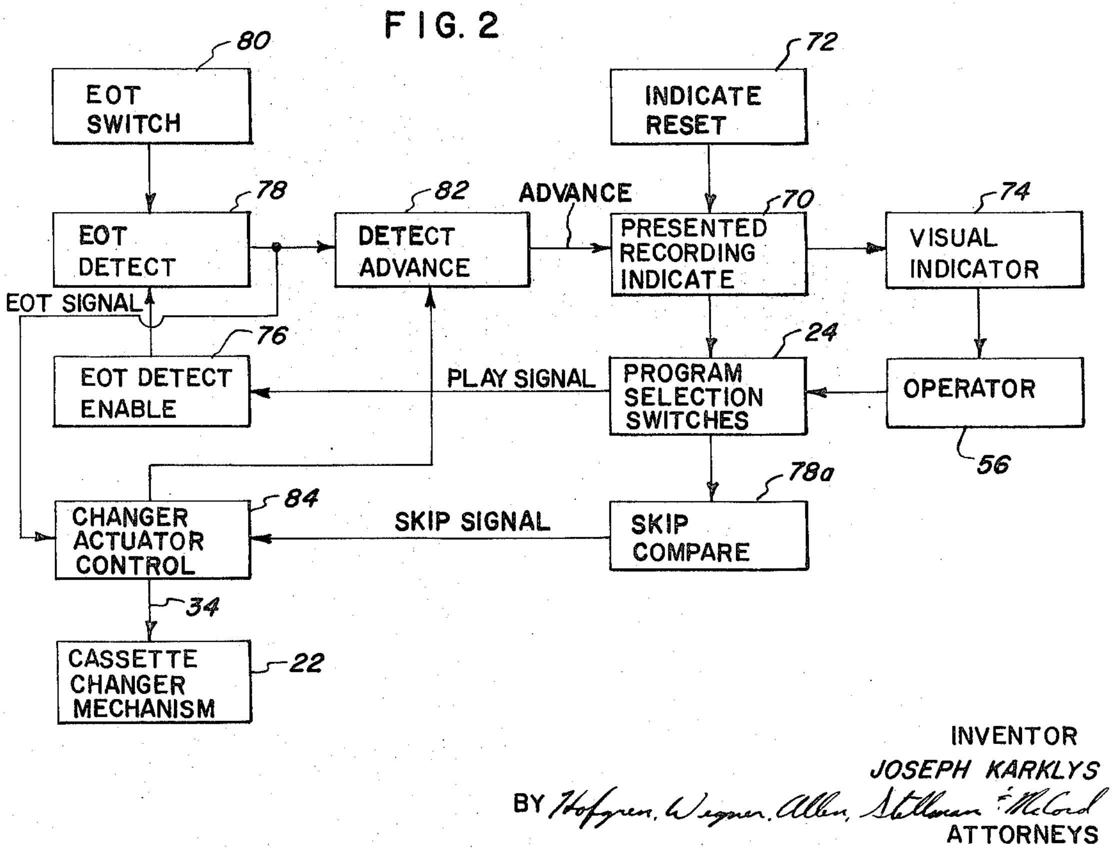
FIG. 2 is a block diagram of the programming circuit embodying the invention.

Turning now to FIG. 2, the programming circuit shown in functional block form will be described in terms of the operation of the cassette changer shown in FIG. 1, after the appropriate program selection switches 24 have been actuated by an operator 56 and side "A" of cassette "TAPE 1" is being presented at "play" position 44. A presented recording indicate circuit 70 assumes a unique state for each cassette tape side or recording during presentation thereof. When power is first applied, an indicate reset circuit 72 resets indicate circuit 70 to a preselected state corresponding to side "A" of cassette "TAPE 1" to insure that the recording indicate circuit 70 will be in synchronism with presentation of cassettes 28 and, accordingly, accurately indicate which cassette tape side or recording is being presented. A visual indicator circuit 74 is provided to control indicator lamps 50 in accordance with the indication given by indicate circuit 70.

When play switch 54 is actuated to start the program, the presented recording, recording "A" of cassette "TAPE 1", as indicated by indicate circuit 70, is compared with the state of the program selection switch 24 corresponding thereto by an EOT (end-of-tape) detect enable circuit 76 and a skip compare circuit 78. If the program selection switch is in a play position, EOT detect enable circuit 76 generates an enable signal to an EOT detect circuit 78 and the presented recording is maintained at play position 44 and played.

At the completion of the recording, an EOT switch 80 is actuated. EOT detect circuit 78, in response to the actuation of EOT switch 80, generates an EOT signal to detect in advance circuit 82 and to a changer actuator or control circuit 84.

The detect advance circuit 82, in response to the EOT signal, generates an advance signal to presented recording indicate circuit 70 which assumes a unique state corresponding to the next cassette tape recording of the sequence, tape side "B" of "TAPE 1". The cassette changer control circuit 84, in response to the EOT signal, generates a pulse on its output 34 which is coupled to the cassette changer mechanism 22. As previously explained, the cassette presenting or changer mechanism 22 is actuated in response to this pulse to present the next cassette tape recording of the sequence, side "B" of "TAPE 1", at the play position 44.

The presentation of the new recording, tape side "B" of "TAPE 1", is indicated by presented recording indicate circuit 70 and the indication is compared with the state of the program selection switch 24 corresponding thereto by EOT detect enable circuit 76 and skip compare circuit 78*a*. If selection switch 24 for side "B" of "TAPE 1" is in a play state, EOT detect enable circuit 76 generates another enable signal and the sequence of control functions, as explained above, is repeated to play that tape. However, if the program selection switch 24 is in a skip state, skip compare circuit 78 generates a skip signal to cassette actuator control circuit 84. Cassette actuator control circuit 84, in response to the skip signal, generates an output pulse on output 34 to cassette presenting mechanism or cassette changer 22 and the next tape recording, tape side "A" of cassette or cartridge TAPE No. 2 is presented thereby, as previously explained.

Also, in response to the skip signal, cassette actuator control circuit 84 generates an output pulse to detect advance circuit 82 which advances the presented recording indicate circuit 70 to a unique state corresponding to the next cassette tape side. This new state of presented recording indicate circuit 70 is again compared by EOT detect enable circuit 76 and skip compare circuit 78*a* which generate their respective signals in accordance with the comparisons made thereby. After all of the tapes have either been played or skipped, a new sequence of cassettes or cartridges may be inserted in feeder mechanism 26 and a new selection may be programmed.

Figure 3:
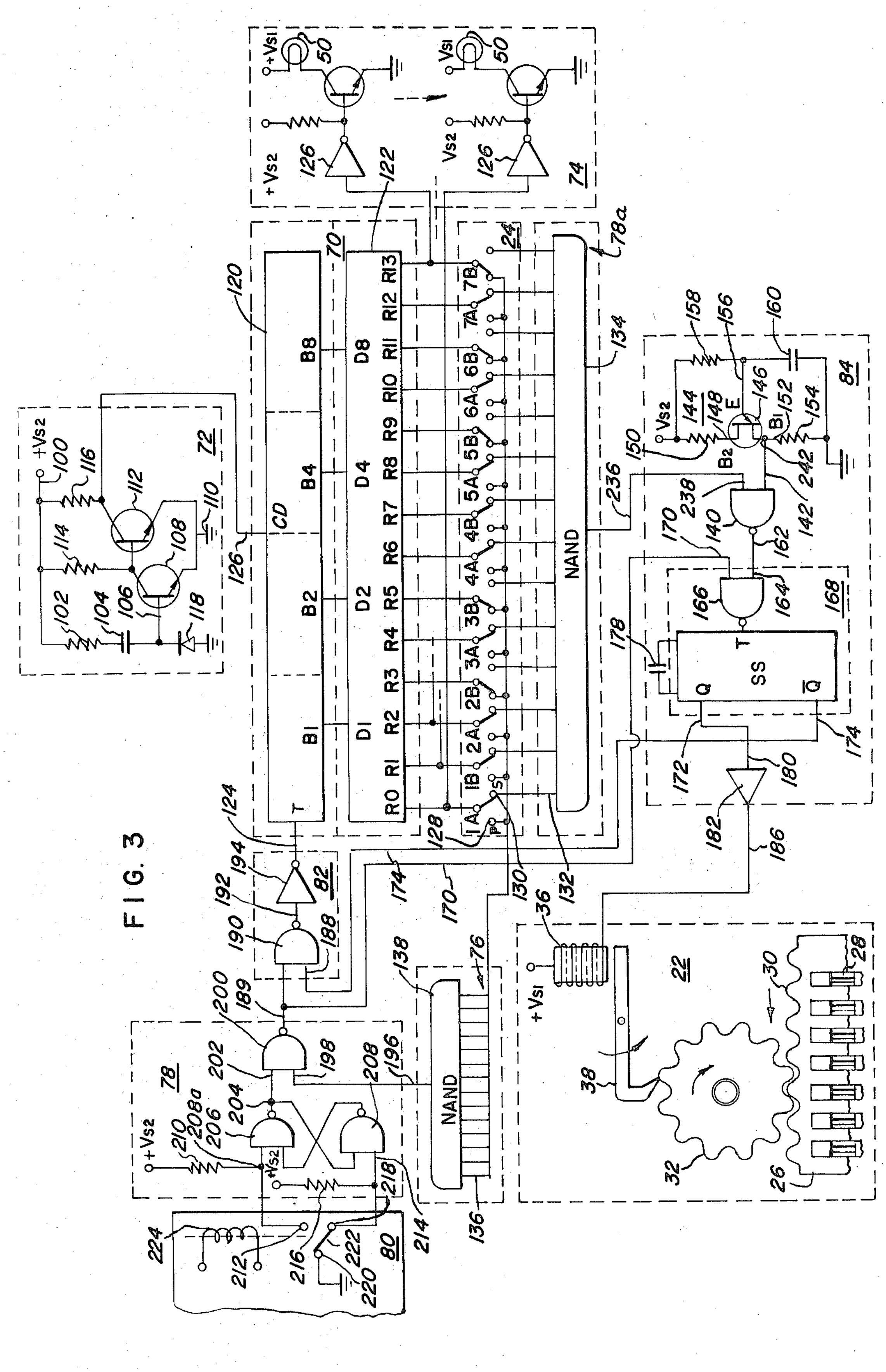
FIG. 3 is a schematic logic diagram of a preferred embodiment of the programming circuit of FIG. 2.

Referring now to FIG. 3, preferred circuit logic schematics for each of the functional circuit blocks of the programming circuit of FIG. 2 are shown. Each of these circuits will be described in chronological order of operation.

The indicate reset circuit 72, as previously explained, resets the presented recording indicate circuit 70 in response to electrical power being applied thereto. When power is first supplied to the programming circuit, a DC supply voltage $V_{s2}$ at junction 100 makes a rapid positive transition from ground to positive DC supply voltage $V_{s2}$. This positive voltage transition is coupled through a resistor 102 and an AC coupling capacitor 104 to the base 106 of an NPN transistor 108 which turns on in response thereto. Transistor 108 has its emitter coupled to a reference potential, such as ground 110, and its collector directly coupled to the base of another NPN transistor 112 and coupled through a load resistor 114 to junction 100. NPN transistor 112 has its emitter coupled to ground 110 and its collector coupled through resistor 116 to junction 100. NPN transistor 112 also has its collector coupled to a reset input of the recording indicate circuit 70 and generates a reset signal thereon as will now be explained.

When transistor 108 turns on at the initial aplication of power, it applies the ground reference potential 110 at its emitter to the base of transistor 112 which is maintained in cutoff thereby. With transistor 112 in cutoff a high voltage reset signal at its collector is coupled to indicate circuit 70 which is reset in response thereto. After a preselected time period, which is determined by the RC time constant of resistor 102 and capacitor 104, capacitor 104 becomes fully charged and no longer conducts base drive current to base 106 of transistor 108 which turns off in response thereto. A diode 118 having its anode coupled to ground and its cathode coupled to base 106 is provided to keep transistor 108 in cut off. When transistor 108 turns off, base drive current from supply voltage $V_{s2}$ is applied through resistor 114 to the base of transistor 112 which turns on in response thereto. When transistor 112 turns on, its collector, which was previously in a high voltage state comprising the reset signal, switches to ground reference potential 110.

The presented recording indicate circuit 70 comprises a four-stage binary counter having four outputs labeled B1, B2, B4 and B8, respectively, coupled to inputs D1, D2, D4 and D8 of decoder circuit 122. The operation of binary counter 120, which is commercially available in a single integrated circuit package, should be familiar to anyone skilled in the art and, thus, will not be described in detail. One such suitable commercially available device is manufactured by Motorola Corporation and designated MC839P. Briefly, each time a negative transition occurs at toggle input 124, binary counter 120 advances by one count. A clear direct input 126 of counter 120 is coupled to the collector of transistor 122 and each time a positive DC voltage, such as the reset signal, is applied thereto, counter 120 is cleared, i.e., each of its outputs assumes a low voltage (ground) binary 0–state. At the end of the reset signal, input 126 returns to a low voltage binary 0–state to enable counter 120 to count.

Decoder 122 comprises a binary coded decimal to decimal converter, such as provided in the 9311 integrated circuit package manufactured by Fairchild Camera & Instrument Corporation. Outputs R0 through R13 of decoder 122 are normally in a high voltage, 1-state, but a 0-state is assumed by the decoder output corresponding to the binary number as represented by the collective binary voltage states applied to its inputs from binary counter 120. For example, with inputs D1 and D4 in a 1-state and inputs D2 and D8 in a 0-state, the collective state of these inputs is the binary equivalent of the decimal numeral five and, thus, output R5 assumes a 0-state. Similarly, with inputs D1, D4 and D8 in a 1-state and input D2 in the 0-state, the binary equivalent of the decimal numeral thirteen is represented and output R13 assumes a 0-state. During operation of the programming circuit, binary counter 120 assumes in numerical order binary states equivalent to the decimal numerals zero through thirteen in response to trigger pulses applied to toggle input 124, and thus, a 0-state is successively assumed in numerical order by decoder outputs R0 through R13. Thus, recording indicate circuit 70 can be considered to comprise a ring counter, i.e., a multi-state counter having successive ones of its stages assuming a selected binary state respectively in response to successive trigger signals.

Outputs R0 through R13 are respectively coupled to the center terminals 1–A through 7–B of program selection switches 24 and to inverter gates 126 of visual indicator circuit 74, the operation of which will be explained in detail hereinafter. Each selection switch 24 had a play contact 128 and a skip contact 130. Skip contacts 130 are respectively coupled to inputs 132 of a NAND gate 134 which comprises skip compare circuit 78 and play contacts 128 are respectively coupled to inputs 136 of a NAND gate 138 which comprises EOT detect enable circuit 76.

In the following description of the operation of the programming circuit it will be assumed that switches 24 are in their respective states as shown in FIG. 3, i.e., switches 24 corresponding to cassette tape sides "1A", "1B", "2A", "4A", "4B", "5A", "6A" and "7A" in the skip state and the remaining selection switches 24 in a play state. When counter 120 is reset, decoder output RO assumes a 0–state which is coupled through switch terminal 1-A and skip contact 130 to an input 132 of NAND gate 134. The gate of a NAND gate assumes a 0–state if, and only if, all of its inputs are in a 1–state and, conversely, assumes a 1–state if any of its inputs are in a 0–state. Thus, output 236 of NAND gate 134 assumes a high voltage, 1–state in response to the 0–state applied to one of its inputs 132 from decoder output RO Output 236 is coupled to input 238 of NAND gate 140 of changer actuator control circuit 84. The other input 142 of NAND gate 140 is taken from an output 242 of a free running oscillator 144 which generates alternating 1–state and 0–state pulses thereon at a suitable frequency, such as approximately 7 Hz.

Oscillator 144 comprises a unijunction transistor 146 having one base 148 coupled through a resistor 150 to DC supply voltage $V_{s2}$, its other base 152 coupled through resistor 154 to ground and its emitter 156 coupled to the junction between a resistor 158 and a capacitor 160 which are serially connected between DC supply voltage $V_{s2}$ and ground. When power is first applied, capacitor 160 charges to the peak voltage of unijunction transistor 146. When the peak voltage is reached, unijunction transistor 146 enters its negative resistance region and turns on to discharge capacitor 160 to its valley voltage whereupon the cycle repeats. The charging time and, thus, the frequency of the oscillator is determined by the RC time constant of resistor 158 and capacitor 160. Although other oscillators could be used, a unijunction transistor oscillator is preferred for the rapid positive transitions of its output.

On the first cycle, when output 142 assumes a 1–state, NAND gate 140, having its other input 238 also in the 1–state, generates a 0–state pulse on its output 162 which is coupled to input 164 of toggle input NAND gate 166 of multivibrator or single-shot 168. Any dual input single-shot could be used, but an integrated circuit single-shot MC851P manufactured by Motorola Semiconductor Products, Inc. has been found to be particularly suitable for this function. If the other input 170 of toggle input NAND gate 166 is in a 1–state, which will be presumed for now, normal output 172 switches to a 1–state and inverting output 174 switches to a 0–state in response to the negative transition of the 0–state pulse applied to input 164. Outputs 172 and 174 remain in their respective states for a preselected time period, at the end of which they respectively return to the 0–state and 1–state. This time period or output width is determined by an RC timing circuit and, due to differentiation of the input is essentially independent of the input pulse width. By providing an external capacitor 178, the pulse width can be increased.

The 0–state pulse appearing on output 172 is coupled to input 180 of amplifier or buffer circuit 182 and appears on output 186. This 0–state pulse on output 186 actuates a suitable automatic changer to present the next recording at the play position. As shown in FIG. 3, such a device may be actuated by energizing a solenoid coil 36. One end of solenoid coil 36 is coupled to a positive supply voltage $V_{s1}$, and the other end is coupled to 186, which, when grounded by the 0–state output pulse, completes the circuit from supply voltage $V_{s1}$ through solenoid coil 36 which is energized thereby to pivot pawl 38, as previously explained.

Simultaneously, the 1–state pulse on output 174 is coupled to input 188 of NAND gate 190 of detect advance circuit 82. NAND gate 190, in response to that 1–state pulse, generates a 0–state pulse on its output 192 which is inverted by inverter gate 195 and appears at toggle input 124 of counter 120 as a 0–pulse having a negative transition at the beginning thereof. Counter 120, as previously explained, is advanced by one count, in response thereto, to the binary equivalent of the decimal numeral one.

In response to counter 120 assuming a binary one count, output R0 returns to a 1-state, and output R1 switches to a 0–state. Since the selection switch 24 corresponding to cassette tape side 1B is also a skip state, output 236 of NAND gate 134 remains in a 1–state, and when the next 1–state pulse is generated on output 142 of oscillator 144, the skip cycle is repeated.

After the first three recordings respectively on cassette tape sides "1A", "1B" and "2A", have been skipped, output R3 switches to a 0–state. Since the selection switch 24 corresponding to side "B" of cassette "TAPE No. 2" is in a play state, the 0–state pulse is not coupled to an input 132 of NAND gate 134, and output 136 switches to a 0–state to disable NAND gate 140, from generating any more trigger pulses to single shot 168. Thus, side "B" of cassette TAPE No. 2 remains in the play position and is played.

However, the 0–state pulse on output R3 is coupled through switch terminal 2–B and play contact 128 thereof to an input 136 of NAND gate 138 which generates a 1–state pulse on its output 196 in response thereto. This 1–state pulse on output 196 is coupled to input 198 of NAND gate 200 of EOT detect circuit 78 which is enabled thereby. The other input 202 of NAND gate 200 is coupled with the normal output 204 of a bistable multivibrator or latch circuit comprising two NAND gates, NAND gates 206 and 208, interconnected in a standard latch circuit configuration. The set input **208*a* of the latch circuit is coupled through a resistor 210 to positive DC supply voltage $V_{s2}$ and directly coupled to fixed contact 212 of a relay actuated double-pole, single-throw EOT switch 80. The reset input 214 is coupled through a resistor 216 to DC supply voltage $V_{s2}$ and directly coupled to the other contact 218 or EOT switch 80. The common switch terminal 220 is coupled directly to ground. It should be appreciated that although a relay actuated switch is illustrated, the EOT detect circuit 78** could be used in conjunction with many other switching circuits, such as a photodetector activated, monostable multivibrator.

While a recording is being played, EOT switch 80 is in a position, as shown in FIG. 3, with the movable switch member 222 connecting the ground reference potential at contact 220 with reset input 214 of the latch circuit. With input 214 in a 0–state, normal output 204 assumes a 0–state and, thus, output 189 of NAND gate 200 assumes a 1–state. When the end of the tape recording is reached, indicating that the recording is completed, a relay coil 224 is energized to momentarily move switch member 222 into contact with switch contact 212. This couples a ground or 0–state to input 208 of NAND gate 206 which switches to a 1–state in response thereto. The 1–state on output 204 is coupled to input 202 of NAND gate 200 whose output 189 switches to a 0–state in response thereto. The 0–state pulse on output 189 is twice inverted by NAND gate 190 and inverter gate 194 and appears as a negative transition at toggle input 124 of binary counter 120 which advances by one count in response thereto. This 0–state pulse on output 189 is also coupled to toggle input 170 of single-shot 168 which generates a 1- state on its normal output 172, in response thereto, to energize solenoid coil 36 and present the next tape recording of the sequence. If the selector switch corresponding to the next recording is in a play position, the EOT detect circuit 78 is again enabled and the play cycle is repeated. If the selection switch 24 corresponding to the next tape recording is in a skip position, then the skip cycle is performed, as previously explained. After all of the recording have been played or skipped, a new sequence of recordings may be inserted in feeder mechanism 26 and a new program established.

The foregoing disclosure of specific embodiments is illustrative of the broad inventive concepts comprehended by the invention.

The embodiments of the invention in which an exclusive property or privilege is claimed are defined as follows:

1. In a magnetic tape player having a changer mechanism which upon being succesively actuated sequentially presents at a single play position a spatially ordered sequence of tape recordings stocked in the changer where they may be individually played, a control for controlling said changer mechanism in accordance with a program such that the player plays in order only preselected ones of said ordered sequence of recordings, comprising: means for preselecting which of the ordered sequence of recordings is to be played; means responsive to actuation of said changer mechanism for indicating which recording is being presented; means connected with said indicating means and said preselecting means for determining whether the presented recording as indicated by said indicating means has been preselected to be played; and means connected with said determining means for controlling said changer mechanism in accordance with a determination made by said determining means including means responsive to indication by said indicating means of presentation at the play position of a nonpreselected recording for actuating said changer mechanism to present at the play position the next recording of said ordered sequence before the nonpreselected presented recording can be played, said indicating means including an electronic memory for assuming a unique state indicative of the recording being presented in response to actuation of the cassette changer mechanism.

2. The tape changer control of claim 1 wherein said electronic memory comprises a binary counter responsive to said actuating means for advancing by one count as each recording is presented.

3. The tape changer control of claim 1 including means for generating an end-of-tape signal in response to completion of the presented tape recording being played, said actuating means actuating said changer mechanism to present the next recording in response to generation thereof.

4. The tape changer control of claim 3 wherein said indicating means is activated in response to said end-of-tape signal to indicate presentment of said next recording.

5. The tape changer control of claim 1 including means for resetting said indicating means to indicate presentment of a predetermined recording of the sequence.

6. The tape changer control of claim 5 wherein said resetting means resets said indicating means in response to application of power thereto.

7. The tape changer control of claim 1 in which said controlling means includes means for generating an alternating signal when enabled, said actuating means actuating said changer mechanism to sequentially present at the ply position said recordings at a rate determined by the frequency of said alternating signal.

8. The tape changer control of claim 7 wherein said determining means includes means for generating a skip signal in response to presentation at the play position of a non-preselected recording, said alternating signal generating means being enabled by said skip signal to generate said alternating signal.

9. In a magnetic tape player having a changer mechanism which upon being successively actuated sequentially presents at a single play position a spatially ordered sequence of tape recordings stocked in the changer where they may be individually played, a control for controlling said changer mechanism in accordance with a program such that the player plays in order only preselected ones of said ordered sequence of recordings, comprising: means for preselecting which of the ordered sequence of recordings is to be played; means responsive to actuation of said changer mechanism for indicating which recording is being presented; means connected with said indicating means and said preselecting means for determining whether the presented recording as indicated by said indicating means has been preselected to be played; and means connected with said determining means for controlling said changer mechanism in accordance with a determination made by said determining means including means responsive to indication by said indicating means of presentation at the play position of a nonpreselected recording for actuating said changer mechanism to present at the play position the next recording of said ordered sequence before the nonpreselected presented recording can be played, said indicating means comprising a ring counter having an output for each one of the sequence of recordings, each output normally in a first state and assuming a second state only when the recording corresponding thereto is being presented.

10. In a magnetic tape player having a changer mechanism which upon being successively actuated sequentially presents at a single play position a spatially ordered sequence of tape recordings stocked in the changer where they may be individually played, a control for controlling said changer mechanism in accordance with a program such that the player plays in order only preselected ones of said ordered sequence of recordings, comprising: means for preselecting which of the ordered sequence of recordings is to be played; means responsive to actuation of said changer mechanism for indicating which recording is being presented; means connected with said indicating means and said preselecting means for determining whether the presented recording as indicated by said indicating means has been preselected to be played, and means connected with said determining means for controlling said changer mechanism in accordance with a determination made by said determining means including means responsive to indication by said indicating means of presentation at the play position of a nonpreselected recording for actuating said changer mechanism to present at the play position the next recording of said ordered sequence before the nonpreselected presented recording can be played, said preselecting means including a selector for each recording of said sequence, each selector having a skip state with those recordings corresponding to a selector in said skip state not being preselected to be played.

11. The tape changer control of claim 10 in which said determining means includes means for generating a skip signal in response to presentment of a recording having its selector in the skip state, said actuating means actuating said changer in response to generation thereof.

* * * * *